No. 622,144. Patented Mar. 28, 1899.
J. J. HEILMANN.
ELECTRIC PROPULSION OF RAILROAD, TRAMWAY, OR OTHER SIMILAR VEHICLES.
(Application filed Sept. 21, 1898.)
(No Model.) 4 Sheets—Sheet 1.

Witnesses.
Carrie Brennan
Grace T Brereton

Inventor.
Jean J. Heilmann
By Geo. T. Whitney
Attorney.

No. 622,144. Patented Mar. 28, 1899.
J. J. HEILMANN.
ELECTRIC PROPULSION OF RAILROAD, TRAMWAY, OR OTHER SIMILAR VEHICLES.
(Application filed Sept. 21, 1898.)
(No Model.) 4 Sheets—Sheet 2.

Witnesses.
Carrie Brennan
Grace P. Brereton

Inventor.
Jean J. Heilmann
By _____
Attorney.

No. 622,144. Patented Mar. 28, 1899.
J. J. HEILMANN.
ELECTRIC PROPULSION OF RAILROAD, TRAMWAY, OR OTHER SIMILAR VEHICLES.
(Application filed Sept. 21, 1898.)
(No Model.) 4 Sheets—Sheet 3.
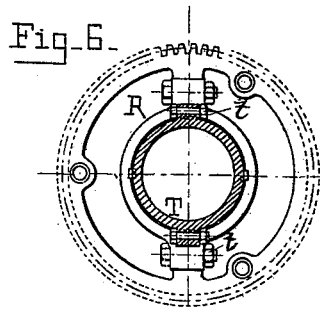
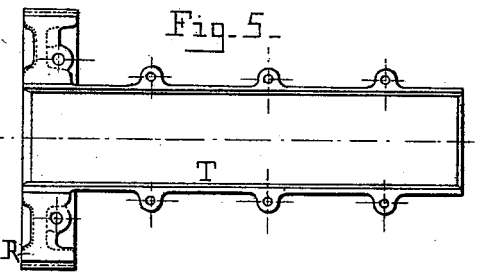
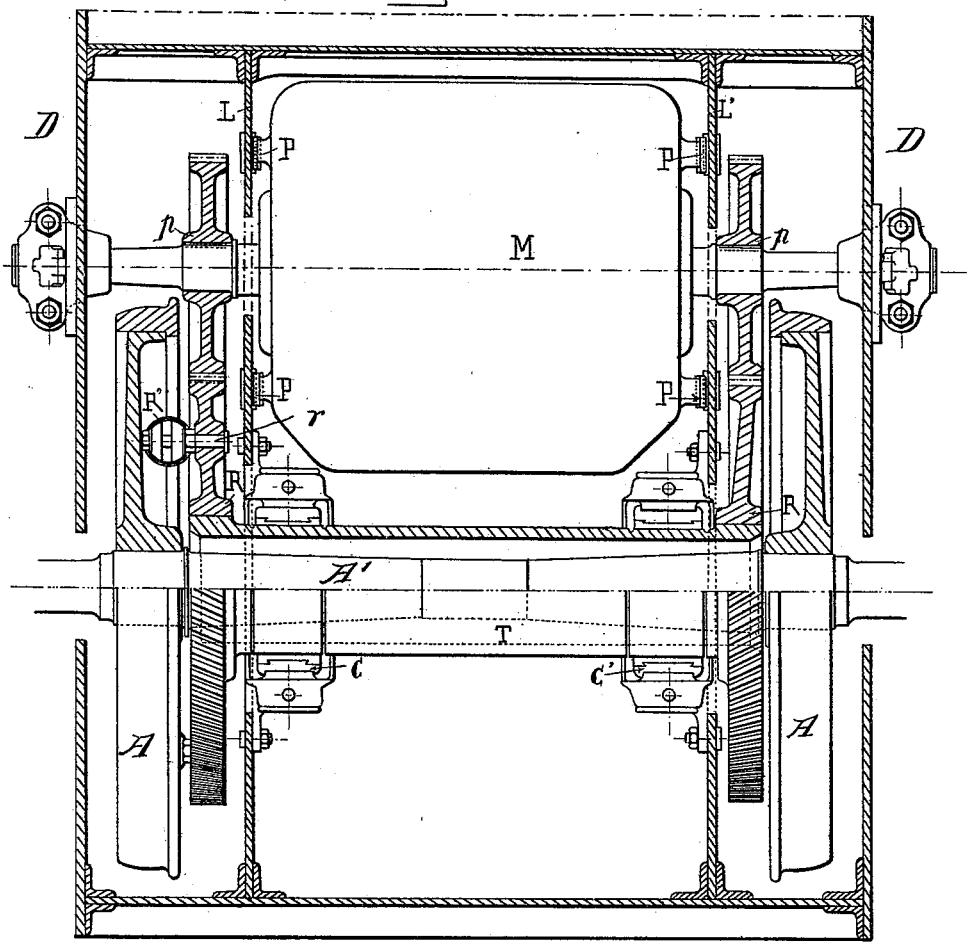
Witnesses.
Carrie Brennan
Grace P. Brereton.
Inventor.
Jean J. Heilmann
By George H. Whitney
Attorney.

No. 622,144. Patented Mar. 28, 1899.
J. J. HEILMANN.
ELECTRIC PROPULSION OF RAILROAD, TRAMWAY, OR OTHER SIMILAR VEHICLES.
(Application filed Sept. 21, 1898.)
(No Model.) 4 Sheets—Sheet 4.

Witnesses. Inventor.

UNITED STATES PATENT OFFICE.

JEAN JACQUES HEILMANN, OF PARIS, FRANCE.

ELECTRIC PROPULSION OF RAILROAD, TRAMWAY, OR OTHER SIMILAR VEHICLES.

SPECIFICATION forming part of Letters Patent No. 622,144, dated March 28, 1899.

Application filed September 21, 1898. Serial No. 691,519. (No model.)

*To all whom it may concern:*

Be it known that I, JEAN JACQUES HEILMANN, a citizen of the French Republic, residing at Paris, in the Department of the Seine, France, have invented certain new and useful Improvements in the Electrical Propulsion of Railroad, Tramway, or other Similar Vehicles, of which the following is a full, clear, and exact description.

This invention relates to the method of and means for the electrical propulsion of railway, tramway, and other similar vehicles in which the electric motor drives the axle of the vehicle. Its object is to enable the motor to drive the axle effectively without the transmission of shocks from the latter to the former.

I will particularly describe my said invention with reference to the accompanying drawings, which illustrate a motor and its driven wheels and axle, and in which—

Figure 1:
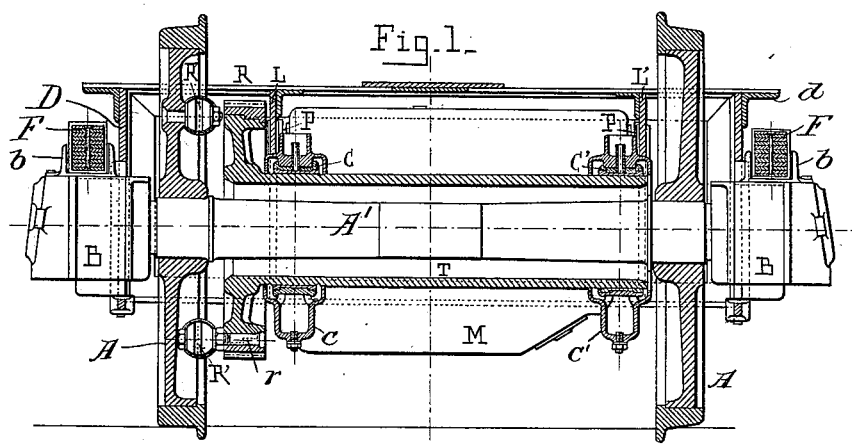
Figure 2:
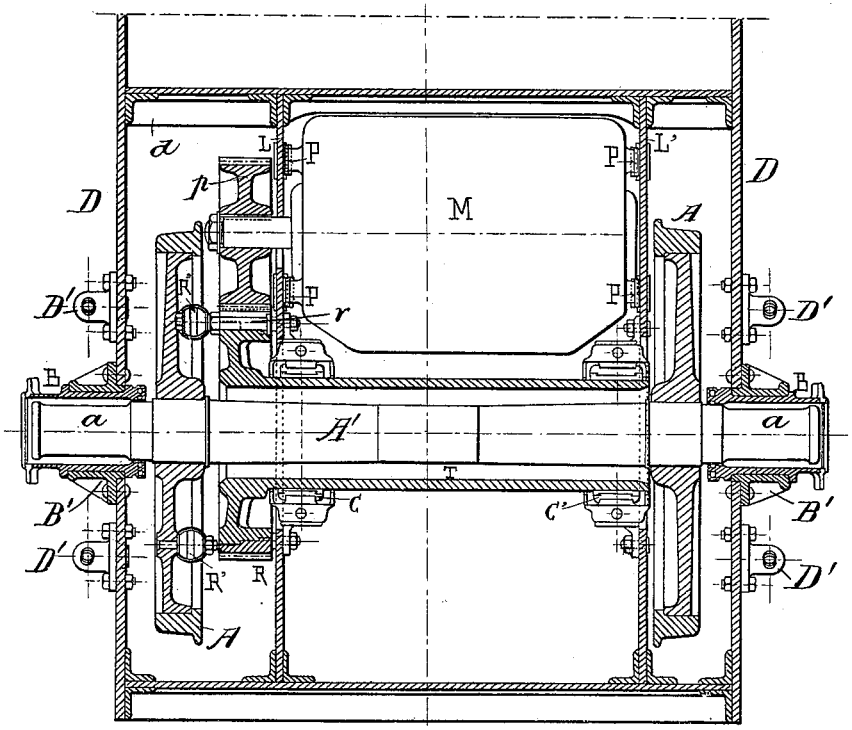
Figure 4:
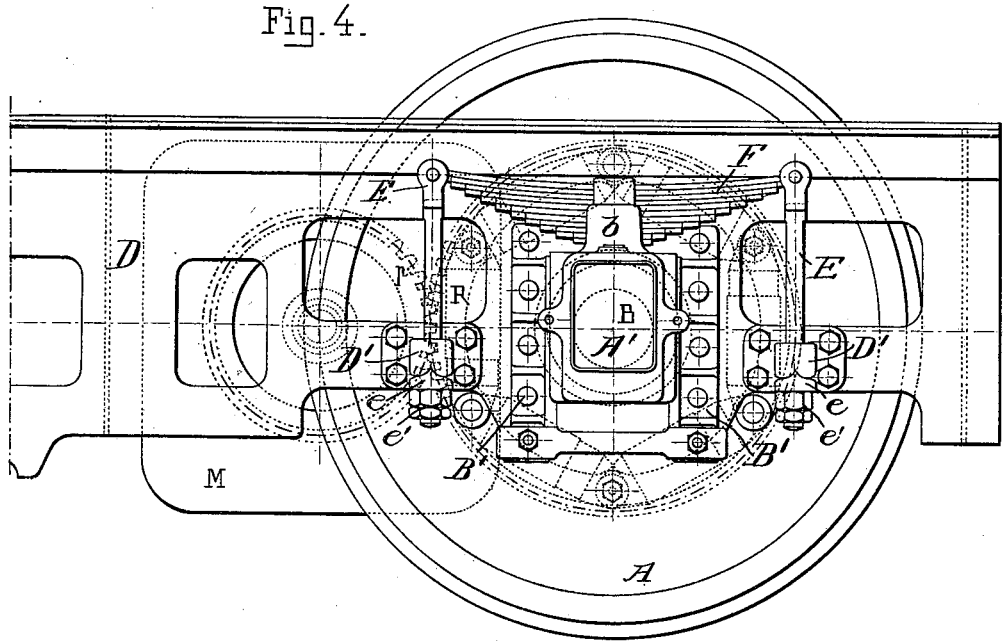
Figure 3:
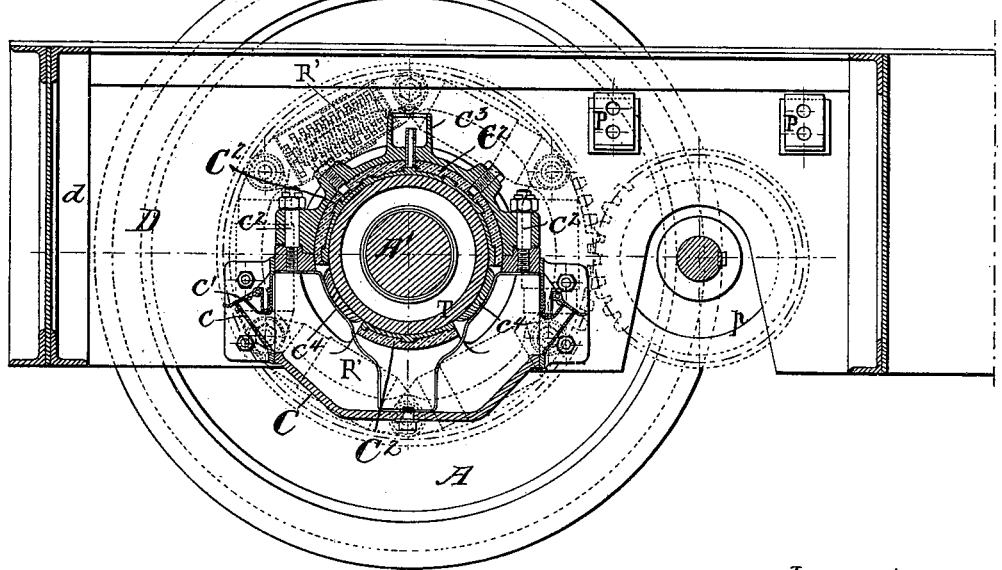
Figure 8:
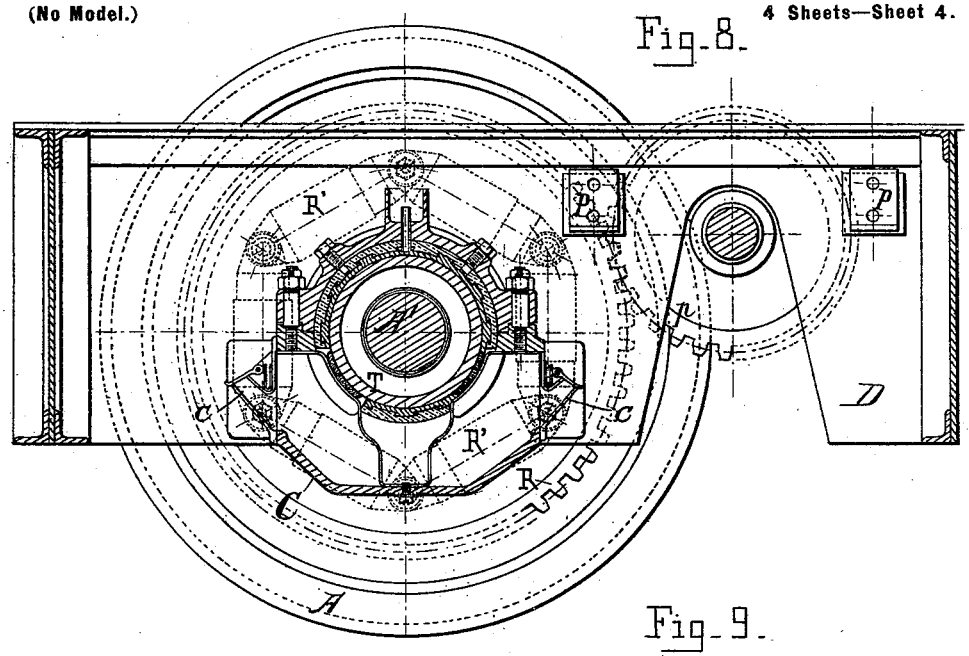
Figure 9:
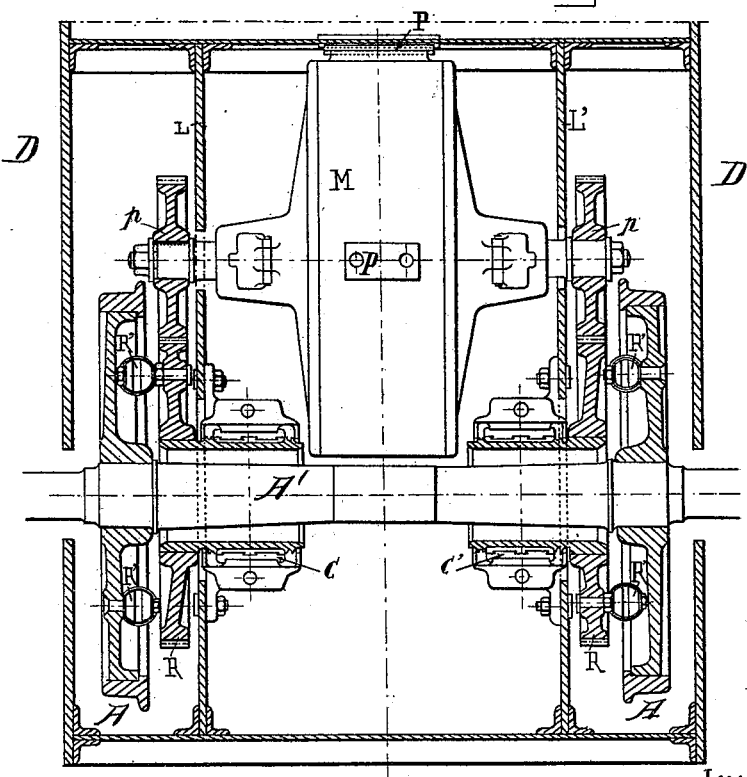

Figure 1 represents a vertical longitudinal section; Fig. 2, a sectional plan; Fig. 3, a vertical transverse section; Fig. 4, a side elevation; Figs. 5 and 6, details; Figs. 7, 8, and 9, modifications, which will be described hereinafter.

In each of the figures similar letters of reference are employed to denote similar parts.

The wheels A are fixed upon the axles A', which have journals $a$, mounted to rotate in the journal-boxes B, which are fitted to slide vertically in the jaws of the pedestals B', which are attached to the truck-frame. This frame is composed, preferably, of metallic plates united by angle-irons $d$. Bolted to the outside plates D on each side of the pedestals are lugs D', perforated to receive the bolts or hangers E. The holes in the lugs are slightly elongated to permit the hangers to swing in a fore-and-aft plane, and the under side of the lugs has a transverse notch to receive a corresponding rib on the top of the collar $e$, which surmounts the nuts $e'$ on the lower end of the hanger. This rib forms, as it were, a knife-edge bearing between the hanger and the frame, so as to permit a perfectly free swinging movement. The upper ends of the hangers are pivotally attached to the ends of the leaf-springs F, the middle of which rests in jaws $b$, formed on top of the axle-box.

An electric motor M is rigidly fastened to the truck-frame, preferably by means of projections P, which are adjustably secured by means of wedges or otherwise to the inner plates L L' of the frame, so that the motor can be adjusted with reference to the frame. The armature-shaft of the motor carries a pinion $p$, which engages with a spur-gear R, fixed upon a hollow shaft T, normally concentric with the axle and of considerably larger inside diameter, so as not to come in contact with the axle. The allowance for play is at least equal to the amount of motion allowed for the axle-boxes—that is to say, whatever may be the relative displacement of the axle owing to irregularities in running this displacement must never bring the axle into contact with the hollow shaft. This hollow shaft is carried in two bearings C C', secured upon the inner plates L L' of the truck-frame, so that the shaft is always parallel with the armature-shaft. The lower half of each bearing C C' is trough-shaped to form a reservoir for lubricants, having a spout $c$ at each end closed by a hinged lid $c'$ for the introduction of oil or the like. The upper half or cap of the bearing is secured to the lower by bolts $c^2$ and carries an oil-cup $c^3$. The brasses $C^2$ may be secured to the two parts of the bearing in any suitable manner. Cleaners $c^4$ press against the shaft on each side, being supported on springs. They serve to keep the shaft free from dirt and grit.

The axle and wheels are driven from the hollow shaft by means of an elastic connection. Such an arrangement is shown in side view in Figs. 3 and 8 and in section in Figs. 1, 2, 7, and 9. At equidistant points around the rim of the gear-wheel R are inserted pins $r$, projecting laterally therefrom. An equal number of similar pins projects from the adjacent wheel A, preferably in the same normal cylindrical plane as the pins on the gear-wheel, so that they all lie in the same circle when viewed from one end of the axle. To each pin on the gear-wheel is attached one end of each of two strong helical springs R', their other ends being similarly attached to the adjacent pins on the car-wheel. These springs therefore afford an elastic or yielding connection between the motor and the axle and do not interfere with the perfectly free movement of the truck-frame up and down on its axle-boxes.

By reference to the drawings it will be seen that the motor is suspended by the vehicle-springs, and that in consequence it is protected from the deterioration and injury which would arise from shocks in running.

The only parts which are not suspended by the vehicle-springs are the wheels and axle.

Figs. 5 and 6 show a detail of construction which may be adopted when it is desired to provide means for permitting the complete separation of the axle from the motor mechanism. The hollow shaft T is divided longitudinally, and the two moieties are connected by the bolts $t$. Similarly the wheel R and the other parts fixed to the hollow shaft are also split and connected by bolts in such a manner that they may with the hollow tube be entirely removable from the axle.

Instead of the single pinion $p$ and spur-wheel shown by Fig. 2 these may be duplicated, as shown by Fig. 7. One pair is then fixed at one end of the motor and the other pair at the opposite end, and the gearing instead of being of the ordinary spur type may be helical, as indicated in Fig. 7, and the inclination of the teeth in one set may be opposite to that in the other, as shown. In order that the driving at the two ends may be equalized, a little side play may be allowed in the bearings of the armature-spindle.

The method of suspension usually employed with geared motors in which the motor rests directly upon the axle by two bearings demands that the axis of the axle and that of the motor should be about in the same horizontal plane; otherwise the effects of inertia produce strong reactions upon the teeth of the wheels. This condition is no longer necessary, and the motor can according to this invention be mounted in any position whatever, as shown, for example, in Fig. 8, where it is located several inches above the horizontal plane of the axle.

Fig. 9 illustrates a case where the diameter of the motor is considerable. In this modified construction the hollow tube T instead of being in a single length is divided transversely into two parts, leaving a space between them into which the motor-framing may penetrate. Each of the two short hollow shafts T' T' is geared with the armature-spindle and drives the axle by a flexible connection, such as R' R' R', already hereinbefore described. In this case also the tubes, wheels, and accessories may be split, as before described with reference to Figs. 5 and 6.

Having now particularly described and ascertained the nature of my said invention and in what manner the same is to be performed, I declare that what I claim is—

1. In an electric locomotive, the combination with the axle, of a truck-frame elastically supported thereon, an electric motor rigidly but detachably fastened to said frame, a hollow shaft journaled in bearings on said frame independently of the motor-frame, normally concentric with the axle and geared to the armature-shaft of the motor, and elastic connections between said hollow shaft and the axle, substantially as described.

2. In an electric locomotive, the combination with an axle and its axle-boxes, of a truck-frame having pedestals to receive said boxes, and provided with perforated lugs notched in their under sides, springs resting on said boxes, hangers attached to said springs and passing through said lugs, and collars on said hangers having ribs to enter the notches in the lugs, substantially as described.

3. In an electric locomotive, the combination with a truck-frame composed of metallic plates and having inner parallel members, of a bearing attached to the inside of each inner member, comprising a hollow lower portion provided with covered openings for the introduction of lubricants, an upper portion provided with brasses and an oil-cup, and a hollow shaft journaled in the bearing and carrying a gear-wheel, substantially as described.

4. In an electric locomotive, the combination with an axle, of a truck-frame elastically mounted thereon, an electric motor rigidly but detachably fastened to said frame, a hollow shaft normally concentric with the axle and journaled in the frame independently of the motor-frame, and two sets of gearing connecting both ends of the armature-shaft with said hollow shaft, substantially as described.

5. In an electric locomotive, the combination with an axle, of a truck-frame elastically mounted thereon, an electric motor rigidly but detachably fastened to said frame, a hollow shaft normally concentric with the axle and journaled in the frame independently of the motor-frame, and two sets of helical gearing connecting both ends of the armature-shaft with said hollow shaft, substantially as described.

6. In an electric locomotive, the combination with an axle, of a truck-frame elastically mounted thereon, an electric motor rigidly but detachably fastened to said frame, a hollow shaft normally concentric with the axle and journaled in said frame independently of the motor-frame, and two sets of helical gearing connecting both ends of the armature-shaft with the hollow shaft, the inclination of the teeth in one set being in the opposite direction to that in the other set, substantially as described.

7. In an electric locomotive, the combination with an axle, of a truck-frame elastically mounted thereon, an electric motor rigidly fastened to said frame, a hollow shaft encircling the axle and made in two parts, each part journaled in said frame, and gearing connecting each end of the armature-shaft with the adjacent part of the hollow shaft, said motor projecting into the space between the inner adjacent ends of the two parts of the hollow shaft, substantially as described.

In witness whereof I subscribe my signature in presence of two witnesses.

JEAN JACQUES HEILMANN.

Witnesses:
HENRY DANZER,
EDWARD P. MACLEAN.